(12) United States Patent
Luh

(10) Patent No.: US 6,609,129 B1
(45) Date of Patent: Aug. 19, 2003

(54) METHOD FOR INTEGRATING VARIOUS INFORMATION OBJECTS AMONG DIFFERENT DATABASES INTO A SYSTEM STRUCTURE

(75) Inventor: Yih-Ping Luh, Hsin-Dan (TW)

(73) Assignee: Hon Hai Precision Ind. Co., Ltd., Taipei Hsien (TW)

( * ) Notice: Subject to any disclaimer, the term of this patent is extended or adjusted under 35 U.S.C. 154(b) by 257 days.

(21) Appl. No.: 09/697,987

(22) Filed: Oct. 26, 2000

(51) Int. Cl.[7] ............................................. G06F 17/30
(52) U.S. Cl. ....................... 707/101; 707/100; 707/102
(58) Field of Search ............................ 707/3, 100, 101, 707/102

(56) References Cited

U.S. PATENT DOCUMENTS 6,092,189 A * 7/2000 Fisher et al. .................. 713/1
6,199,068 B1 * 3/2001 Carpenter ................... 707/100
6,339,767 B1 * 1/2002 Rivette et al. ................. 707/2
6,366,824 B1 * 4/2002 Nair et al. ................... 700/115

* cited by examiner

Primary Examiner—Jean M. Corrielus
(74) Attorney, Agent, or Firm—Wei Te Chung

(57) ABSTRACT

Based upon an item master, the present invention establishes a 3-tier data structure containing a bill of material (BOM), an item master, and a related information object (a file or datum) and integrates various information management software modules or information objects stored in the BOM, the item master and the related information object in the same database into an information module. For the information modules in different databases, the present invention further utilizes the tree structure of the item master to link required information together, forming an integrated information structure that enables each information object to communicate with one another and share information among databases.

24 Claims, 9 Drawing Sheets

METHOD FOR INTEGRATING VARIOUS INFORMATION OBJECTS AMONG DIFFERENT DATABASES INTO A SYSTEM STRUCTURE

BACKGROUND OF THE INVENTION

1. Field of Invention

The present invention relates to a method of establishing an integrated information system and its structure and, in particular, to a method and its system structure for integrating information objects in different databases so as to share information.

2. Related Art

For computer software products recognized by most consumers, they can be classified into system software and application software. The former is the necessary software to construct or establish a computer system, whereas the latter is the tool used by usual companies, education units or individuals.

From the viewpoint of the system levels, one can have the following basic levels:

Operating system, such as the UNIX or Windows 95, 98, NT system;

Database management system (DBMS);

Product data management (PDM) system.

As to some large application software or information management application software, one can classify them as:

CAD/CAM/CAE software;

Enterprise resource planning (ERP) software;

Production management software, such as MIS, MRP, MRP II, CRP, JIS, etc.; and

Office automation management software.

In the computer information network of an enterprise, there may be many different systems (such as the UNIX and PDM) and many different information management application software programs (such as CAD, CAM, CAE and MIS). In such a huge and complicated enterprise information network, any user may face the difficulty in searching data or sharing information distributed among different databases or even being stored in different systems.

This kind of enterprise information network has another problem, namely, the problem of data storage resource waste due to duplicated data. For example, the marketing department needs some structure data of a particular product (such as the list of elements, the assembly diagram, etc). However, due to different systems or the fact that the required data are not stored in an accessible database, people in the marketing department cannot retrieve the related data already existed in the R/D department. Therefore, the marketing department is forced to set up the data of this product in their own system or database. This causes data storage resources waste and lowers the efficiency in the enterprise.

Thus, how to integrate the data or the related information stored in different databases or systems and build up their connections so as to achieve the goal of sharing information and reducing resources waste is the subject of the present invention.

SUMMARY OF THE INVENTION

It is a primary object of the invention to provide a method to integrate information objects stored in different databases.

It is another object of the invention to provide an integrated information structure that enables the links among different information management software modules developed separately and information objects distributed in different databases so that different software modules can communicate with one another and share the information.

The techniques disclosed herein take an item master as a basis. Related information stored within each database can be linked and integrated together through some item master. Information stored in different but related databases can also be linked together through a tree structure formed according to the item masters in all databases. This achieves the ultimate goal of integrating and sharing information among different databases.

The disclosed method includes a means to establish an information module. The method mainly takes a 3-tier structure containing a bill of material (BOM), an item master, and a related information object to establish an information module that links the BOM, the item master and the related information object. With such an information module, products (such as some commodity or project) in some database and its related information can be integrated together for the convenience of a user to manage or utilize them.

The disclosed integrated information structure takes numbers of the above-mentioned information modules as its constituent elements. Through these information modules with such a 3-tier structure, all the related information belonging to a particular product, project or information object in the same database can be integrated. For information modules in different databases, the present invention further utilizes the tree structure of the item masters in different databases to construct a special linking structure that links information modules distributed in different databases. Therefore, the information objects among different databases can communicate with one another and the information can be shared.

BRIEF DESCRIPTION OF THE DRAWINGS

The present invention will become more fully understood from the detailed description given hereinbelow illustration only, and thus are not limitative of the present invention, and wherein.

DETAILED DESCRIPTION OF THE INVENTION

The contents of the present invention will be illustrated using an information system shown in FIG. 1 in the following description. Suppose that the information system of some enterprise has the following databases and application modules:

MIS database 10*a*: MIS application module;

Design database 10*b*: Design management application module;

3D CAD database 10*c*: 3D CAD application module;

CAE database 10*d*: CAE application module;

MRP database 10*e*: MRP application module;

MRP II database 10*f*: MRP II application module; and

CAPP database 10*g*: CAPP application module.

Figure 1:
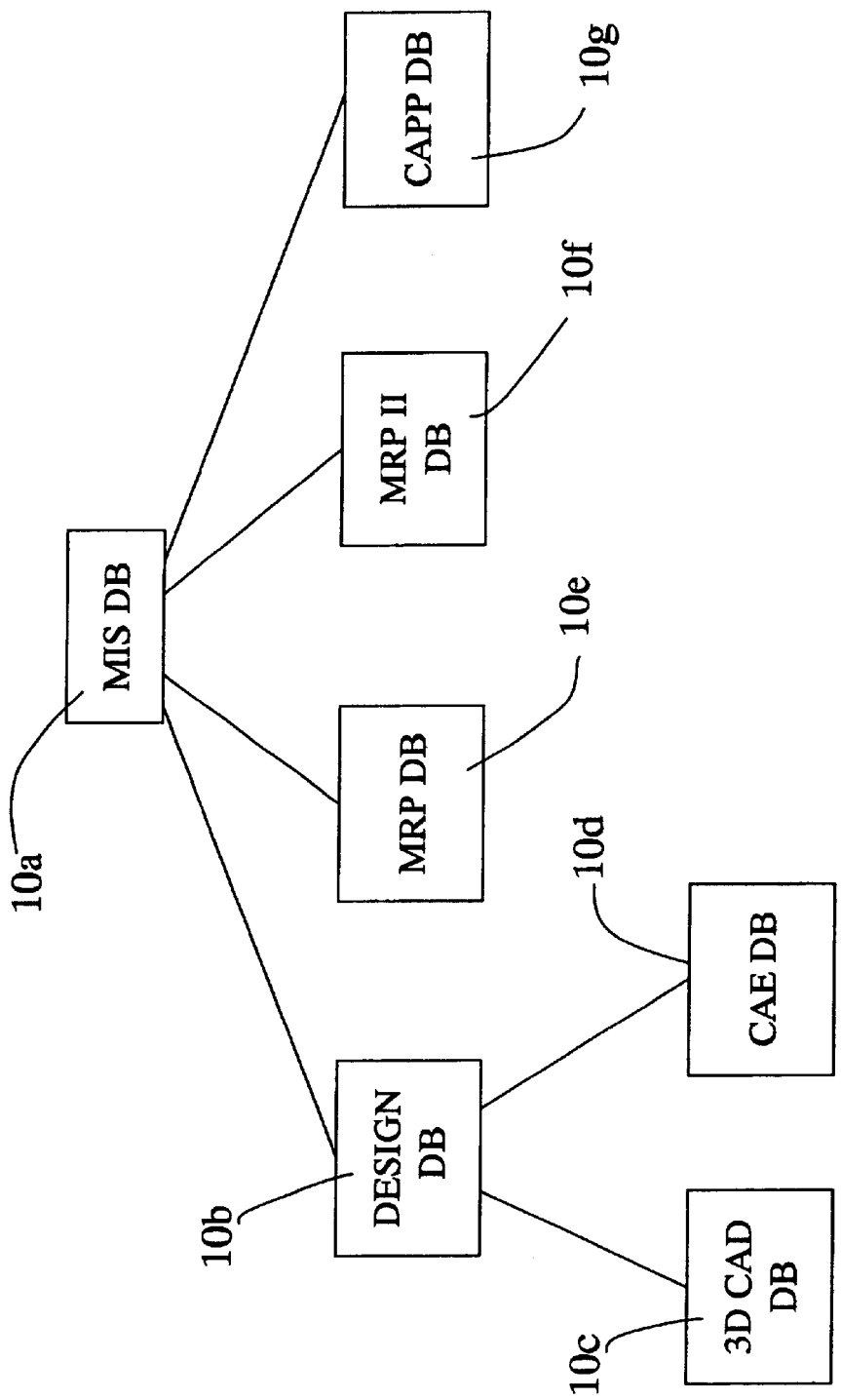
FIG. 1 is a tree structure diagram of an information system for implementing the disclosed technique.

All the above databases exist in accordance with the tree structure shown in FIG. 1. If related information of a product exists in different databases, the tree structure and connections shown in FIG. 1 are not enough to serve quickly for information search or application among the databases.

The instant invention thus proposes a technique that integrates all information related to a particular product by utilizing an item master object. Each database contains an item master object. Such item master objects that integrate all the related information of the same product are linked together to integrate the related information in all the databases.

The method disclosed herein basically includes the following steps:

1. Establish an item master object in each database to integrate all information related to a particular product in the database.
2. Construct an item master tree structure among different databases. In this step, it is mainly to establish connections among item master objects of different databases so as to integrate related information in all databases.

Figure 2:
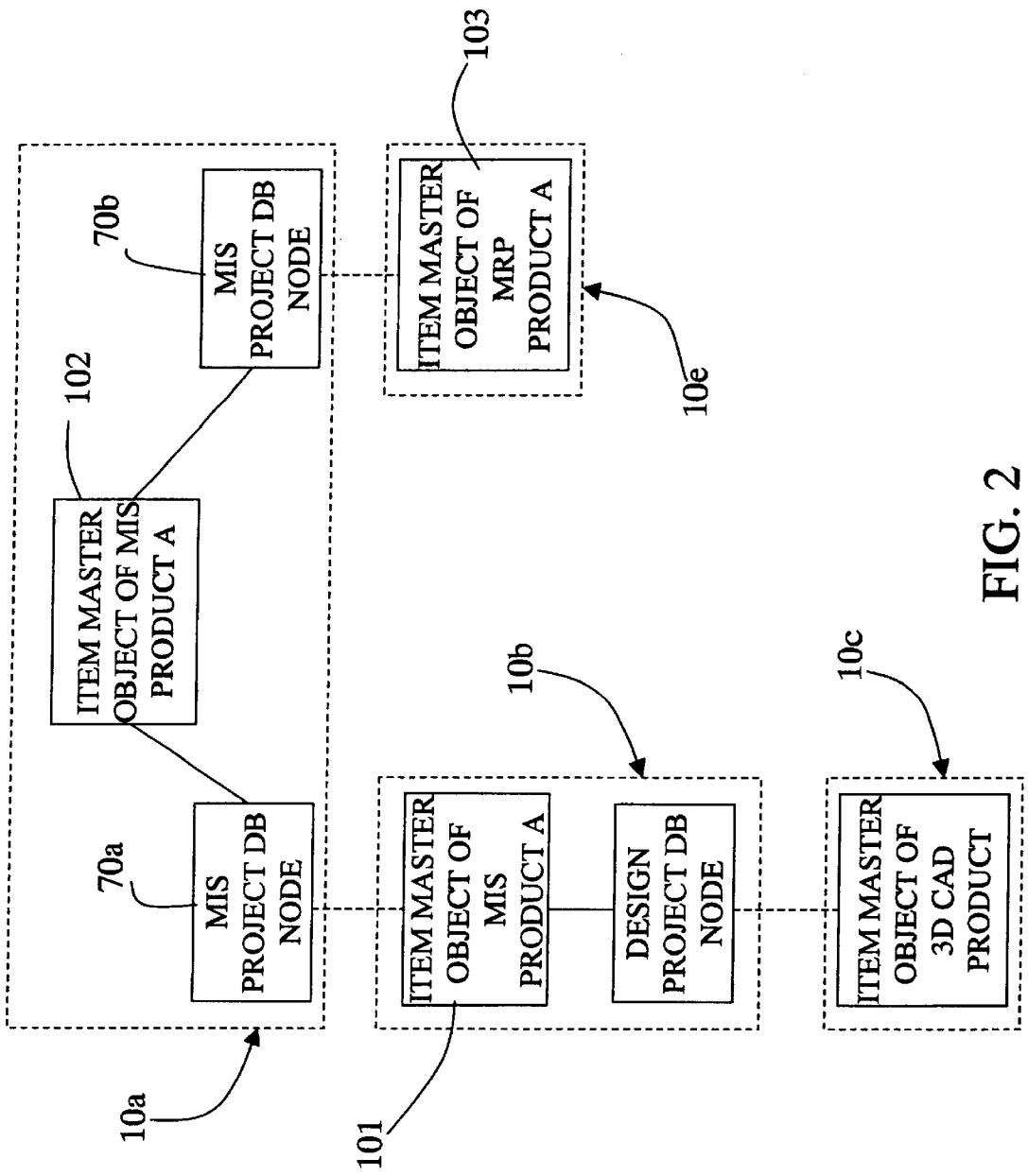
FIG. 2 is an integrated information structure of the information system in FIG. 1 established according to the disclosed technology.
Figure 5:
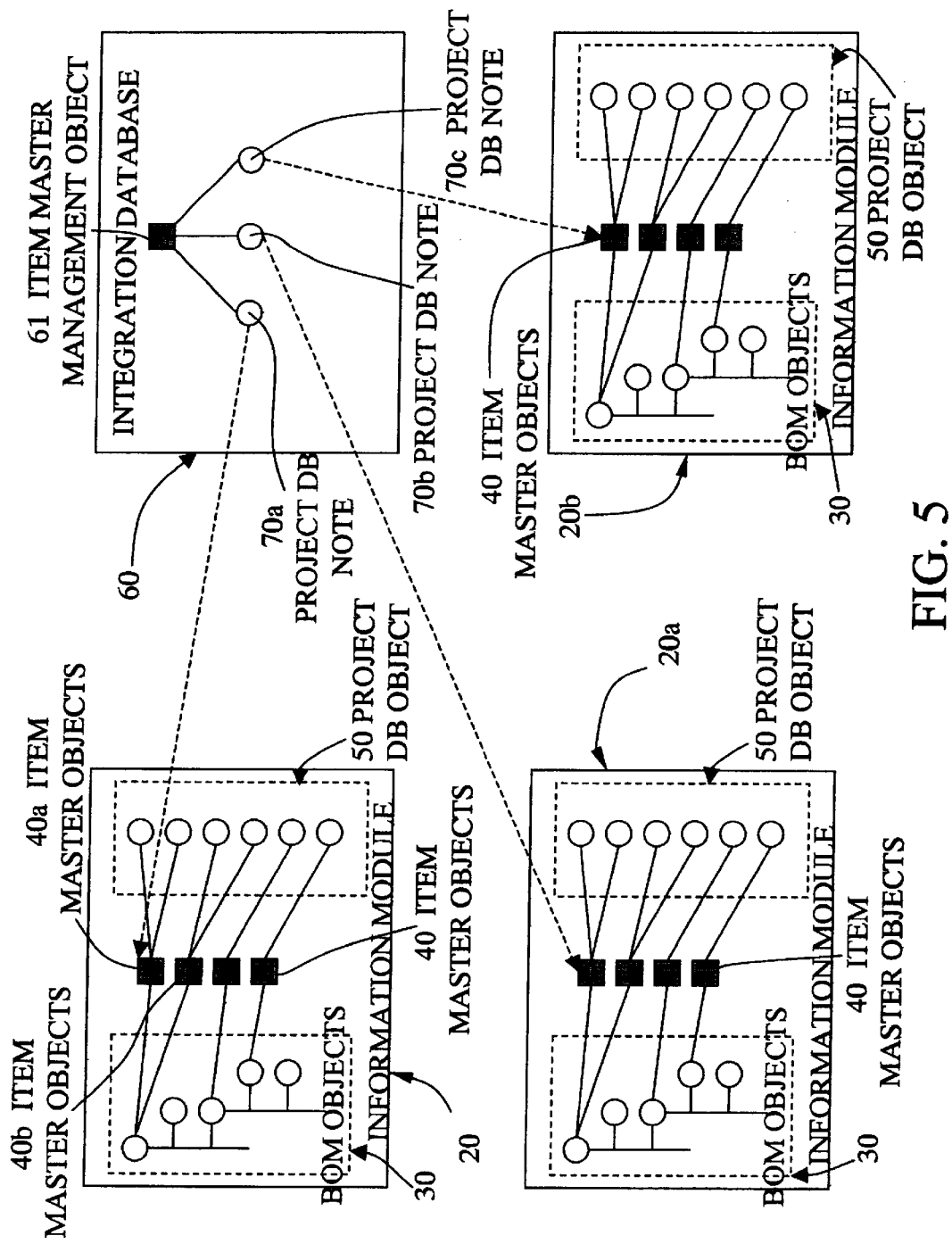
FIG. 5 is an integrated information system structure established based upon the disclosed information modules.
Figure 8:
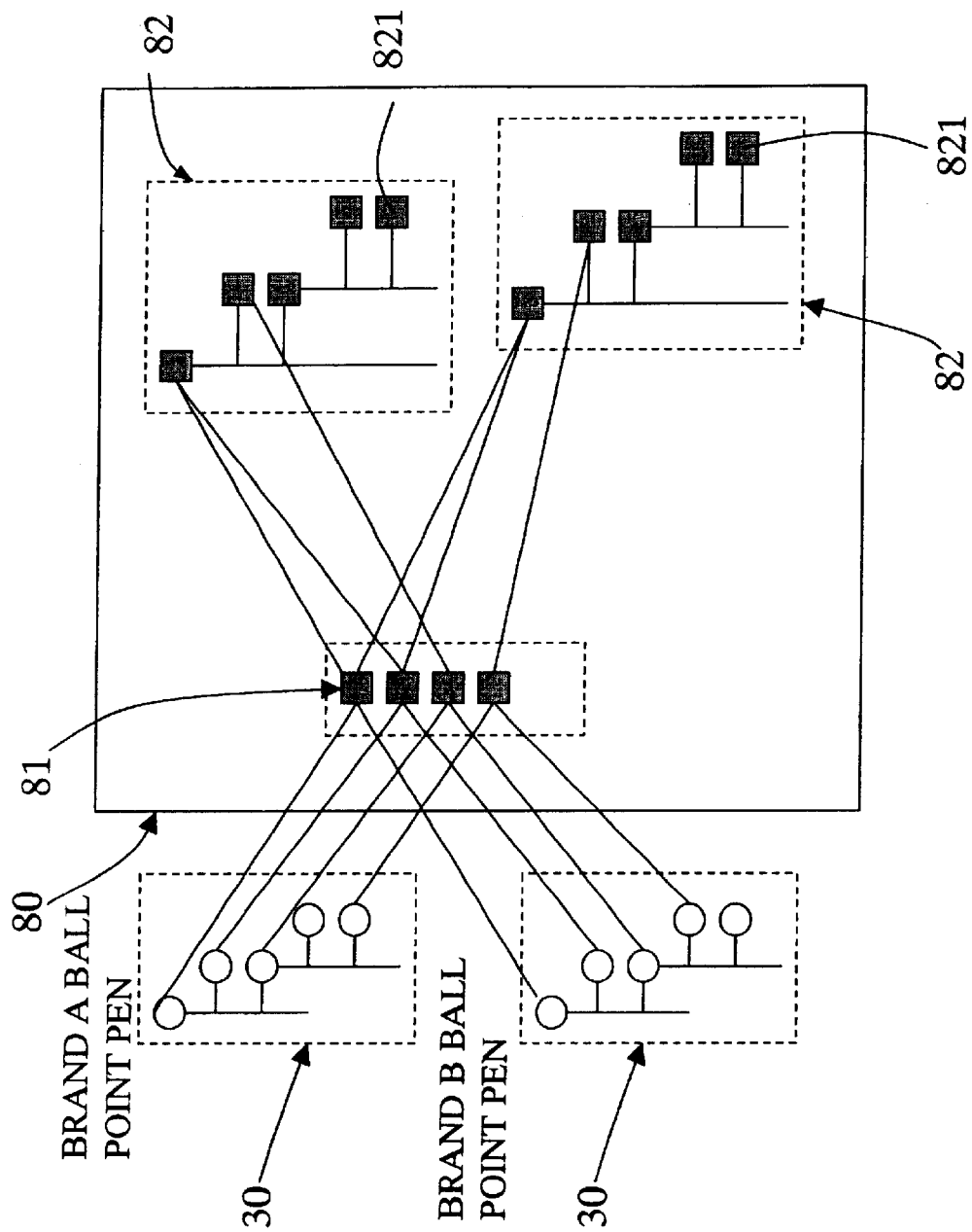
FIG. 8 shows a structure of the product core.

For instance, in the information system in FIG. 1, all related information of product A is distributed in the design database 10*b*, the 3D CAD database 10*c*, and the MRP database 10*e*. According to the disclosed method, the item master object of the product A will exist in all these three databases and the MIS database 10*a* that integrate the item master objects of the product A in the three databases. These item master objects of the product A distributed in different databases will establish connections among them through cross-database linking nodes 70*a*, 70*b*, 70*c*, 70*d* (as shown in FIGS. 2, 5, 8), forming an integrated information system shown in FIG. 2.

If one needs to search for information related to the product A in the MRP database 10*e* in a cross-database way, he can find the item master object 102 of the product A in the MIS database 10*a* through the item master object 101 of the product A in the design database 10*b*, thereby to find out the item master object 103 of the product A in the MRP database 10*e*. Finally, through the item master object 103 of the product A, one can obtain the information related the product A from the MRP database 10*e*.

According to the first step in the above-mentioned method, one first sets up an item master object in each database. This item master object will integrate all information related to a particular product in the database into an information module by establishing relations among various kinds of information. Through the second step mentioned before, an item master tree structure across different databases is established, forming the integrated information structure of the invention. The detailed contents will be described as follows.

Figure 3:
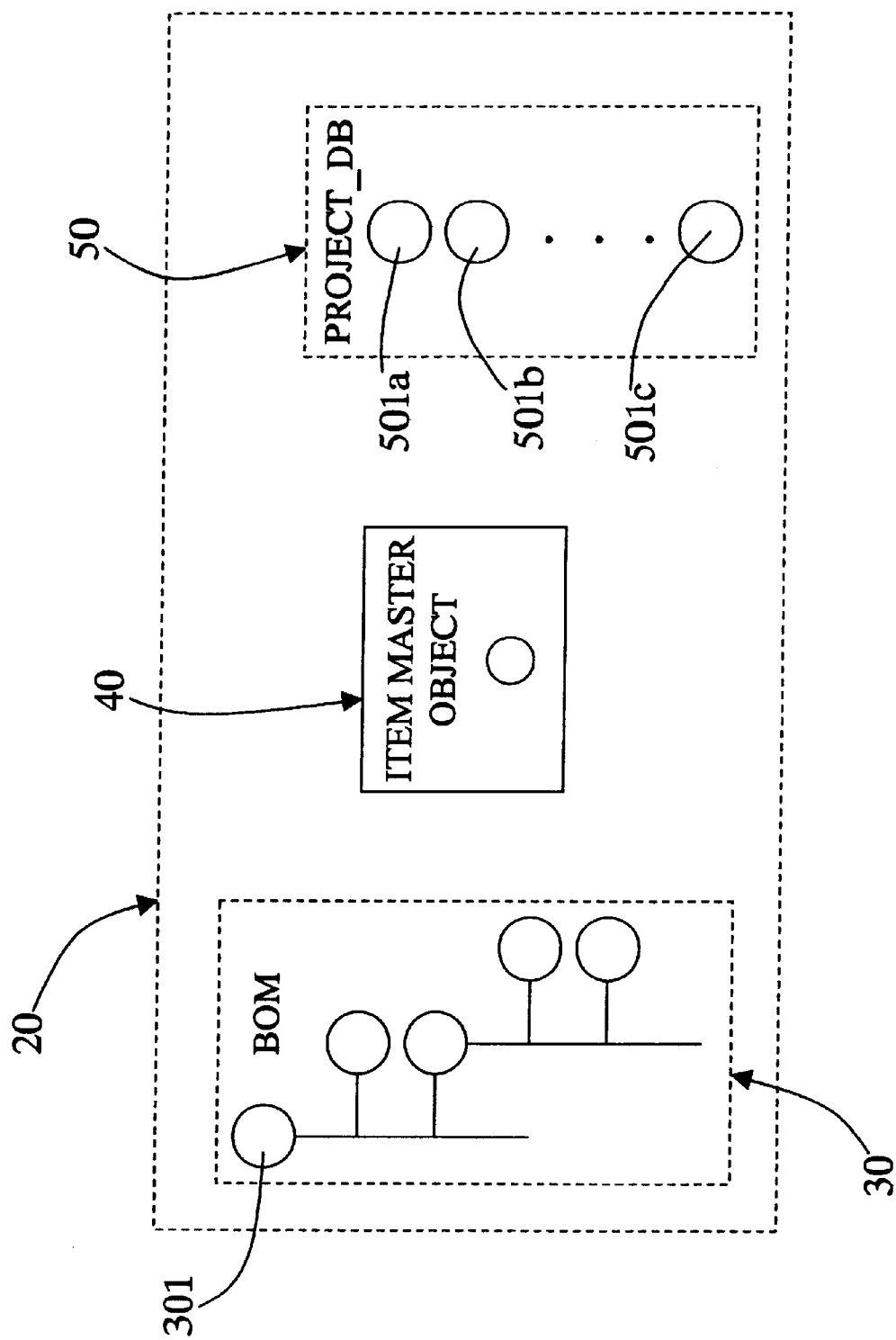
FIG. 3 is a schematic view of the disclosed information module.

With reference to FIG. 3, the information module 20 constructed by the invention includes three objects; namely, a bill of material (BOM) object 30, an item master object 40, and a related information object (a file or datum). Since most of the related information objects are stored in a project database, we will therefore call them Project_DB objects 50. These three types of objects will form a 3-tier structure according to the connection relations shown in FIG. 4.

The BOM object 30 uses many nodes 301 of the tree structure (hereinafter as BOM nodes) to store the level structure of the same hyper-type product. Such a hyper-type product can be a product (e.g., a motor), a project (e.g., a sale project), or an information object (e.g., an administration management system). In the disclosed techniques, the BOM object 30 is not limited to be a structure recording products. It can be a structure of projects, software, device components, stocking management or even the administrative and financial structure.

The function of the item master object 40 is integrating and linking all sorts of related information in the information module 20. More explicitly, it establishes and manages the data relations for a particular product in the information module 20.

The Project_DB object 50 stores various kinds of useful information. It may contain only one file or datum 501*a* or a set of several files or data 501*a*, 501*b*, 501*c*. The information here refers to any data type that can be stored in the data storage device of a computer (such as an optical disk, a floppy disk or a hard drive). The data format can be a document, a database, a video clip, an image or a wave file.

Figure 4:
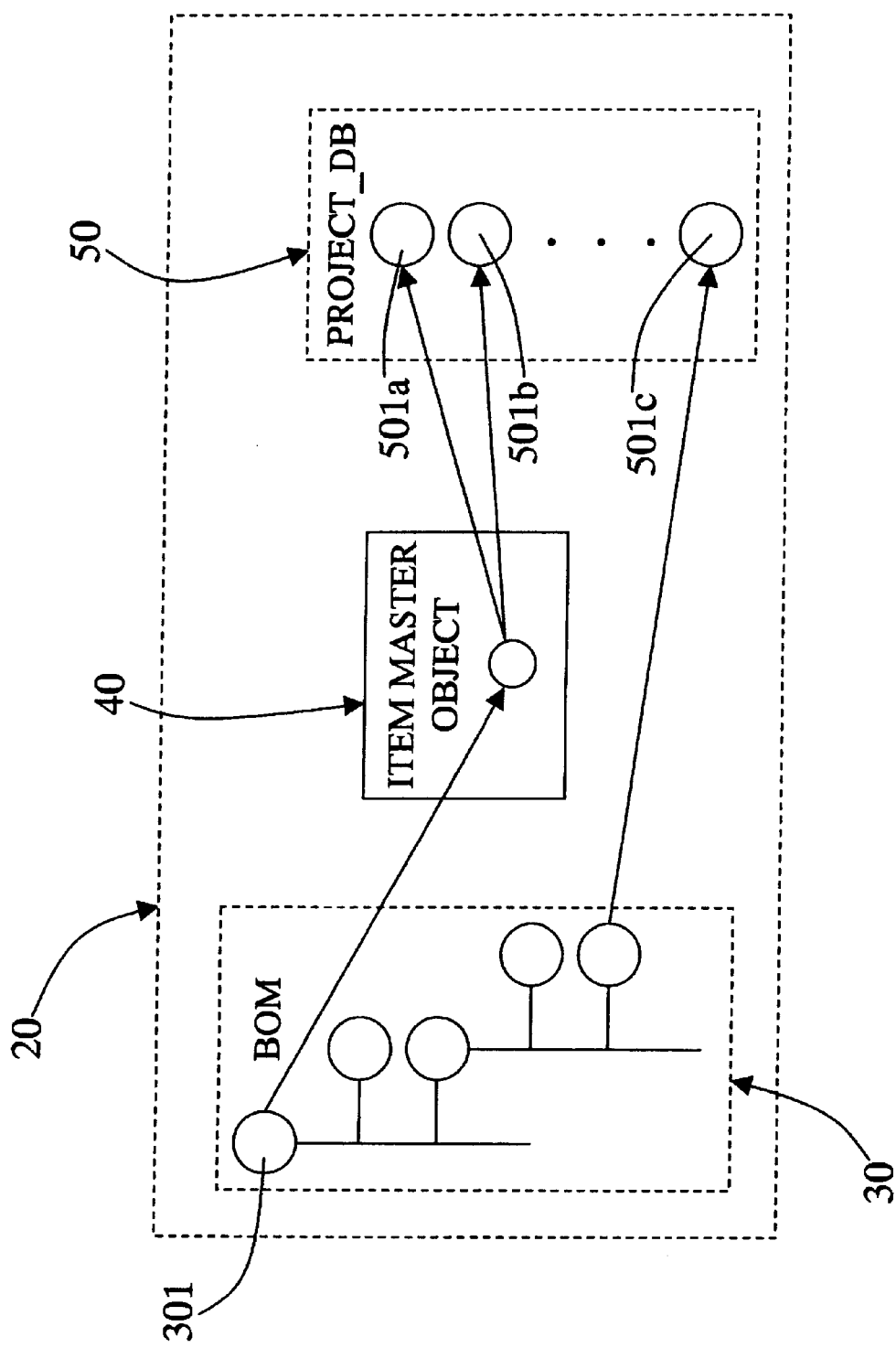
FIG. 4 shows a 3-tier structure of the disclosed information module.

As shown in FIG. 4, the fundamental composition of the disclosed information module 20 includes a single item master object 40. This item master object 40 manages all related information for a particular product. That is, the item master object 40 links information related to a product (e.g., one or more of the BOM nodes 301, or one or more files or data 501*a*, 501*b*, 501*c*) separately distributed in the BOM object 30 and the Project_DB object 50 into an information module 20 with a 3-tier structure. Generally, an information module 20 may contain more than one of the BOM objects 30 and more than one of the Project_DB objects 50. Therefore, a single item master object 40 may connect with one or more of the BOM objects 30 and one or more of the Project_DB objects 50, depending upon the distribution of the product-related information in the BOM objects 30 and the Project_DB objects 50.

The information module 20 integrates all information related to a particular product, project or information object. Similarly, when a database contains information of many products, there will be many item master objects 40, 40*a*, 40*b* in the same database (FIG. 5) to integrate the information. In step 2 of the disclosed method, an item master tree structure is constructed to link the information modules 20, 20*a*, 20*b* distributed in different databases, forming an integrated information structure (FIG. 5).

The link types in the integrated information structure include:

1. Logic link: It is used to establish the connections among hyper-type objects in the same information module 20. The connections among the BOM object 30, the item master object 40 and the project_DB object 50 are established through the logic link.
2. Hierarchical link: It is used to establish the connections among sub-type objects (e.g., the BOM nodes 301) in the same hyper-type object (e.g., the BOM objects 30).
3. Hyperlink: It is used to link the information modules 10 across different databases or different information management software modules, constructing an information-shared integrated information structure.

The present invention uses a special structure constructed with an item master tree structure across different databases to link the information modules 20, 20*a*, 20*b* belonging to different databases so that the information management software modules or information objects across different databases can share information contained therein.

Figure 6:
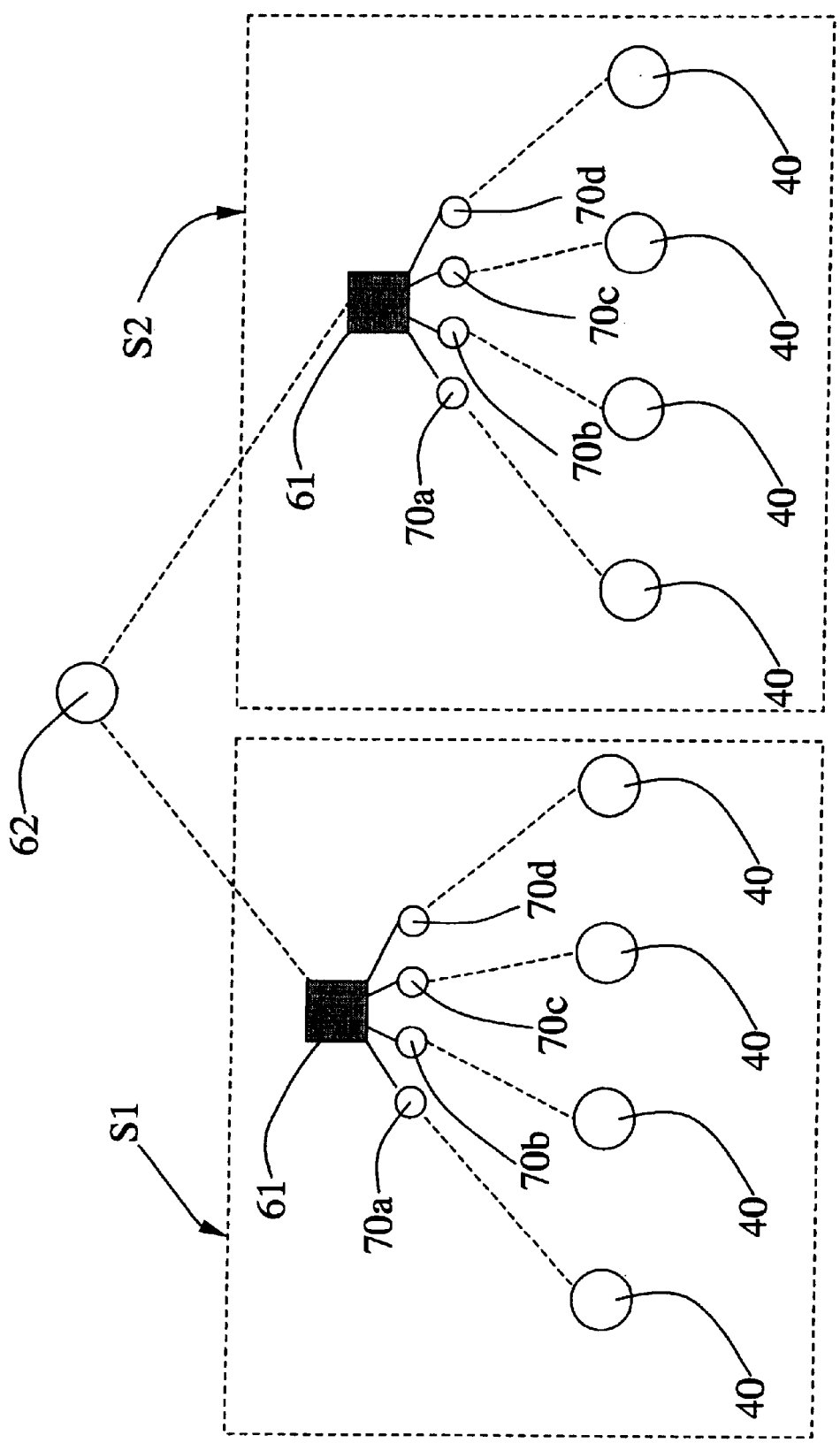
FIG. 6 shows a tree structure of the item master.

As shown in FIG. 5, such an item master tree structure across different databases mainly contains item master objects 40 in the information modules 20, 20a, 20b of different databases and an item master management object 61 constructed in an information integration databases 60. Therefore, in the example of the item master tree structure across different databases, the item master management object 61 is a parent node and the item master objects 40 are the daughter nodes of the item master management object 61 (FIG. 6).

Thus, when applying the method of constructing an item master tree structure across different databases to the information system shown in FIGS. 1 and 2, the item master object 101 of the product A in the design database 10b and the item master object 103 of the product A in the MRP database 10e are such daughter nodes in the item master tree structure. The item master object 102 of the product A in the MIS database 10a is the parent node of the previous two objects. Analogously, according to the same principles, one can integrate different information systems by creating parent nodes from the bottom up to establish a parent node management object 62 managing the item master management objects 61 in different information systems S1, S2 (FIG. 6), forming an integrated information structure across different systems.

In this item master tree structure communicating across different databases, the item master management object 61 at the parent node and the item master object 40 at any daughter node are linked through project DB nodes 70a, 70b, 70c, 70d of the database. Such links among the project DB nodes 70a, 70b, 70c, 70d are a kind of hyperlink and therefore can complete the information linking across different databases. In order to distinguish the link types, a solid line represents a logic link and a dashed line a hyperlink.

Figure 7:
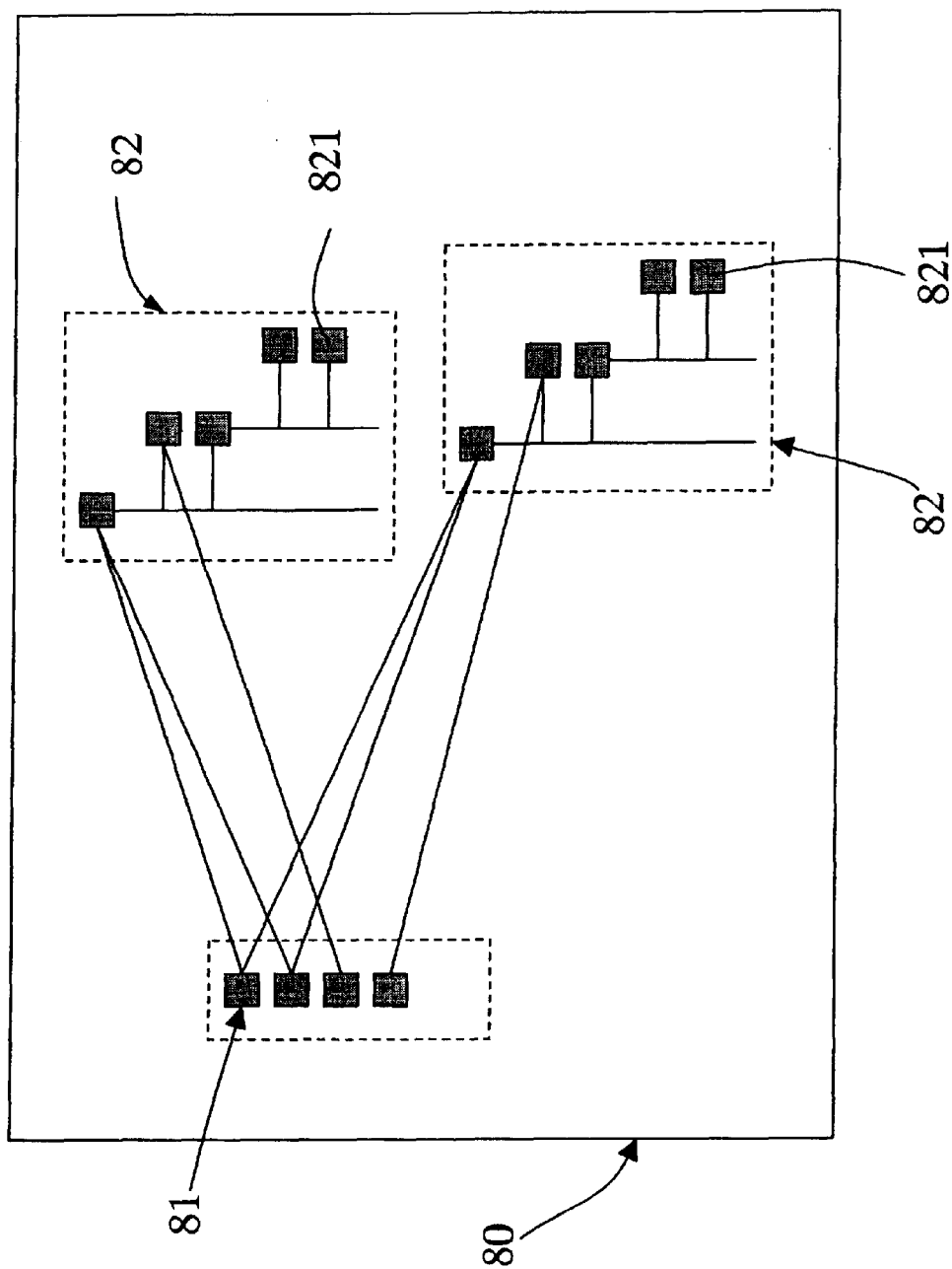
FIG. 7 shows a product core structure that combines the item master and product idea structure.

With reference to FIG. 7, another embodiment of the invention further utilizes the technology of using the item master objects to construct a product structure core 80. The product structure core 80 is a data structure concept based upon product concepts. Under this technology, the item master objects are classified into two hyper-types: one is called the real item master object 81 and the other is called the option item master object 82.

The real item master object 81 represents different real products (e.g., ball point pens of brand A and brand B). The option item master object 82 generally refers to the abstract classifications of products (e.g., ball point pens, pens, brush pens). Logic links are used to demonstrate the association of a real product and a specific product type between the real item master object 81 and the option item master object 82. Since the option item master object 82 represents abstract product types, one can use it to explain or present the complicated structure composed of the component structure or material structure of a particular type of product. Therefore, the option item master object 82 has a tree structure, including many option item master object nodes 821 (hereinafter referred as nodes).

For the same reason, a particular database may have many real item master objects 81 and many option item master objects 82. Therefore, there may be many real item master objects 81 associating with the same option item master object 82.

Figure 9:
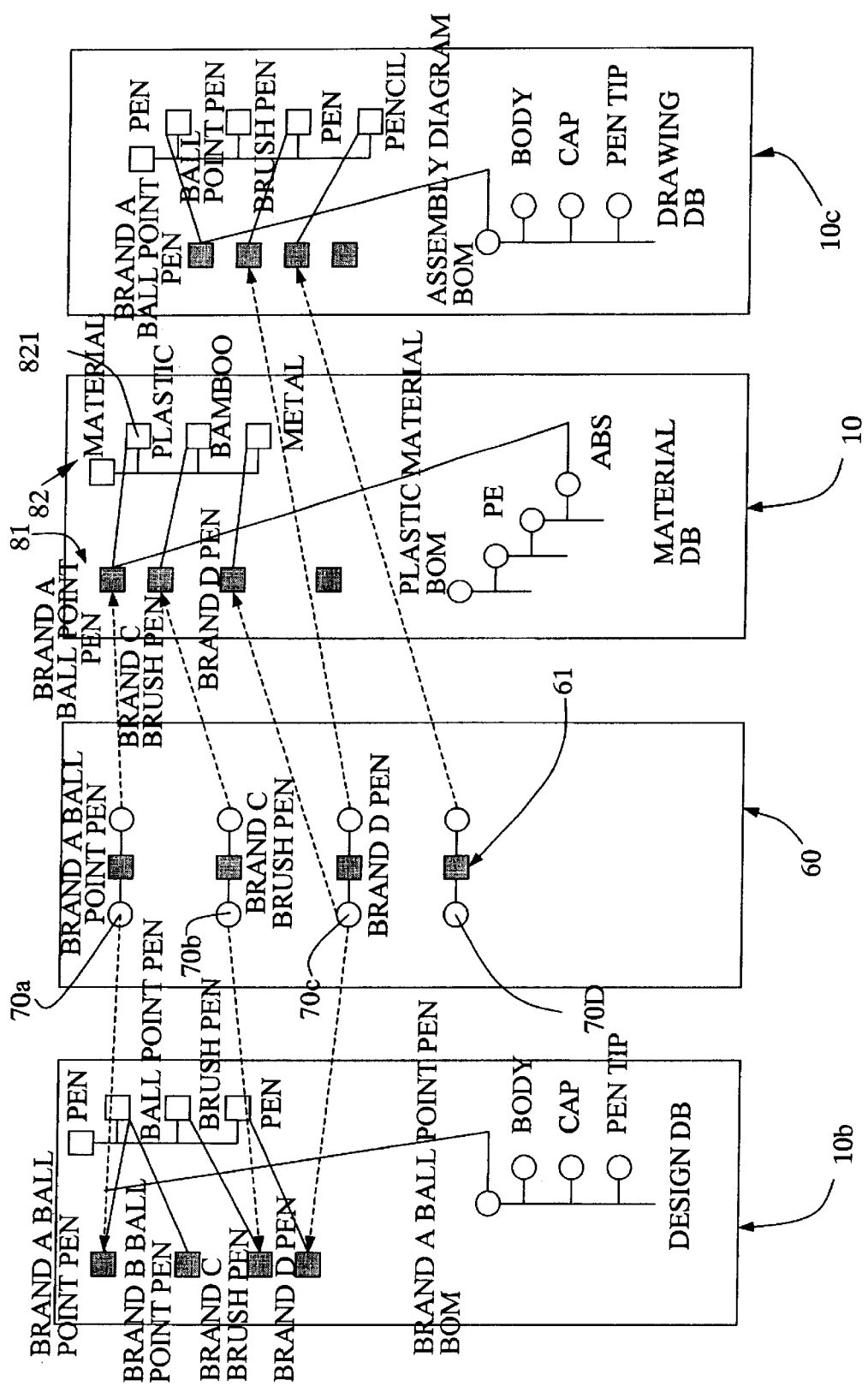
FIG. 9 shows an integrated core structure of the product information among different databases.

A product core structure is then formed by linking the product structure core 80 with the BOM objects 30 of different products (e.g., ball point pens of brand A and brand B). The structure is shown in FIG. 8. Finally, the core structure containing the real item master objects 81, the option item master objects 82 and the BOM objects 30 and the product core structures distributed in different databases 10 are integrated with the structure shown in FIG. 9.

From the above description, one can know that the integrated information structure constructed according to the disclosed method has the following functions:

1. A user can clearly understand the structure of a particular product, project or information object by looking at the hierarchical information structure presented through the BOM object with a tree structure.
2. Through the special connection structure comprised of the item master tree structure across different databases, the information modules distributed in different databases can be linked so that information can be shared among information management software modules or information objects across different databases.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An integration method for linking various information objects among different databases into a system structure that enables the information objects to communicate and share information, the method comprising the steps of:
   establishing item master objects in said databases, respectively, each of said item master objects used for linking all information related to a particular product in the respective database; and
   establishing an item master object tree structure across said different databases, wherein the item master object tree structure comprises an item master management object and the item master objects distributed in the databases that are linked together wherein each of the item master objects is a daughter node of the item master management object.

2. The method of claim 1, wherein the step of establishing an item master object in each database further comprises the step of establishing an information module containing the item master object, a bill of material (BOM) object, and a related information object.

3. The method of claim 2, wherein the step of establishing the information module further comprises the step of establishing logic connections among the item master object, the BOM object and the related information object.

4. The method of claim 3 further comprising the step of building a tree structure with a plurality of BOM nodes from the BOM object for storing the hierarchical structure of products belonging to the same hyper-type.

5. The method of claim 1, wherein the step of establishing an item master object tree structure across different databases comprises the step of establishing an information integration database to store the item master management object.

6. The method of claim 5, wherein the step of establishing the information integration database comprises the steps of:
   generating linking nodes across the different databases;
   establishing the logic links among the linking nodes across the different databases and the item master management objects; and
   establishing the hyperlinks among the linking nodes across the different databases and the item master object.

7. An integration structure for integrating information stored in different sites, the integrating structure comprising:
- a plurality of databases, including at least one bill of material (BOM) object and a related information object;
- an item master object constructed in each of the databases to form an information module with a 3-tier data structure by linking with the BOM object and the related information object for integrating all information related to a particular product; and
- an information integration database, which includes at least one item master management object and cross-database linking nodes that link the item master management objects, wherein the item master management objects form a cross-database item master tree structure through the hyperlinks between the cross-database linking nodes and the item master object and the item master management object is a parent node of the item master object to link all of the item master objects of a product in the plurality of databases.

8. The integration structure of claim 7, wherein each of the database has at least one item master object.

9. The integration structure of claim 7, wherein each of the databases has a plurality of item master objects.

10. The integration structure of claim 9, wherein each of the item master objects links all information related to a particular product within the same database.

11. The integration structure of claim 7, wherein the product refers to a real commodity.

12. The integration structure of claim 7, wherein the product refers to a project structure.

13. The integration structure of claim 7, wherein the product refers to an organization structure.

14. The integration structure of claim 7, wherein the product refers to a program structure.

15. The integration structure of claim 7, wherein the BOM includes a plurality of nodes constituting a hierarchical structure for storing the same hyper-type products.

16. The integration structure of claim 7, wherein the related information object stores information that is accessible to computers.

17. The integration structure of claim 16, wherein the information stored in the related information object is selected from a group comprising documents, databases, videos, images and audio files.

18. The integration structure of claim 7, wherein the item master object, the BOM object and the related information object are associated with via logic links.

19. The integration structure of claim 7, wherein the item master object further comprises a real item master object and an option item master object.

20. The integration structure of claim 19, wherein the real item master object represents a real product.

21. The integration structure of claim 19, wherein the option item master object represents an abstract classification of a product.

22. The integration structure of claim 21, wherein the abstract classification of the product is the type of the product.

23. The integration structure of claim 19, wherein the option item master object is a tree structure containing a plurality of object nodes for storing the hierarchical structure of a particular type of products.

24. The integration structure of claim 19, wherein the real item master object and the option item master object illustrate the association of a real product with a specific product type via logic links.

* * * * *